Patented Feb. 21, 1950

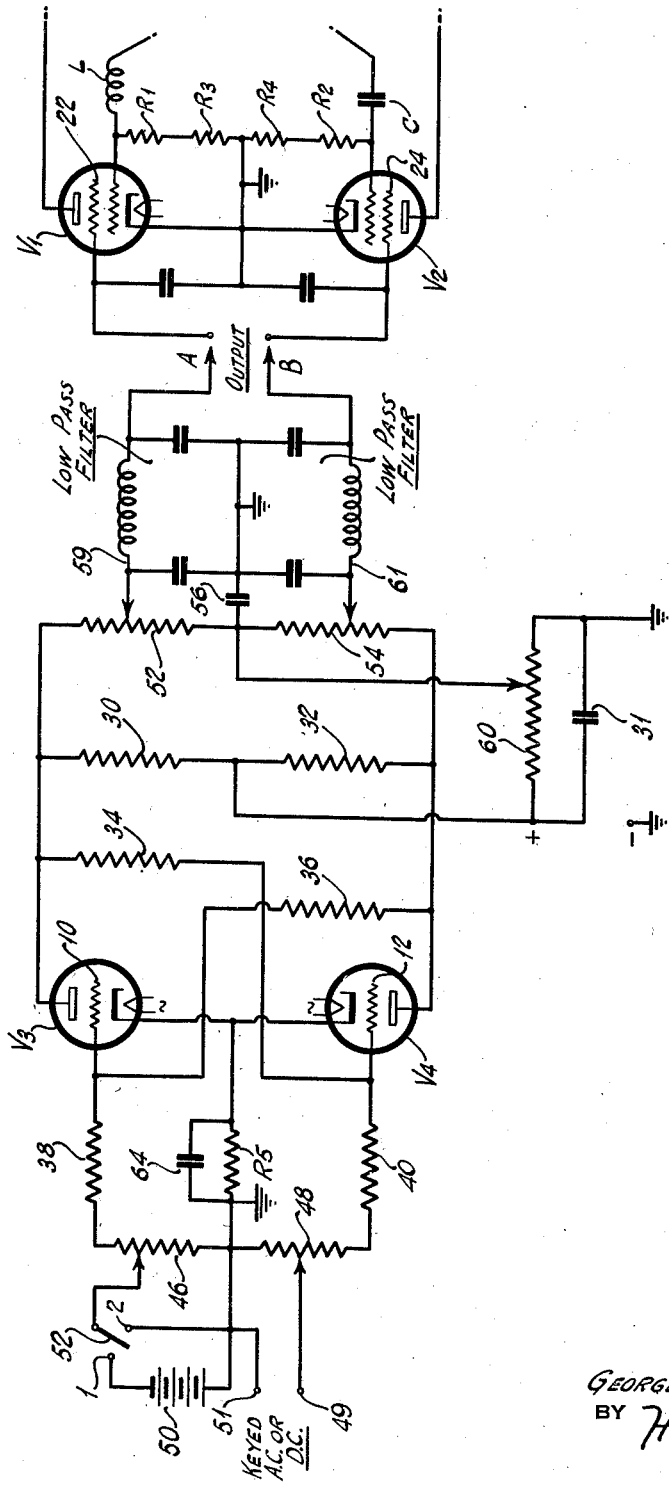

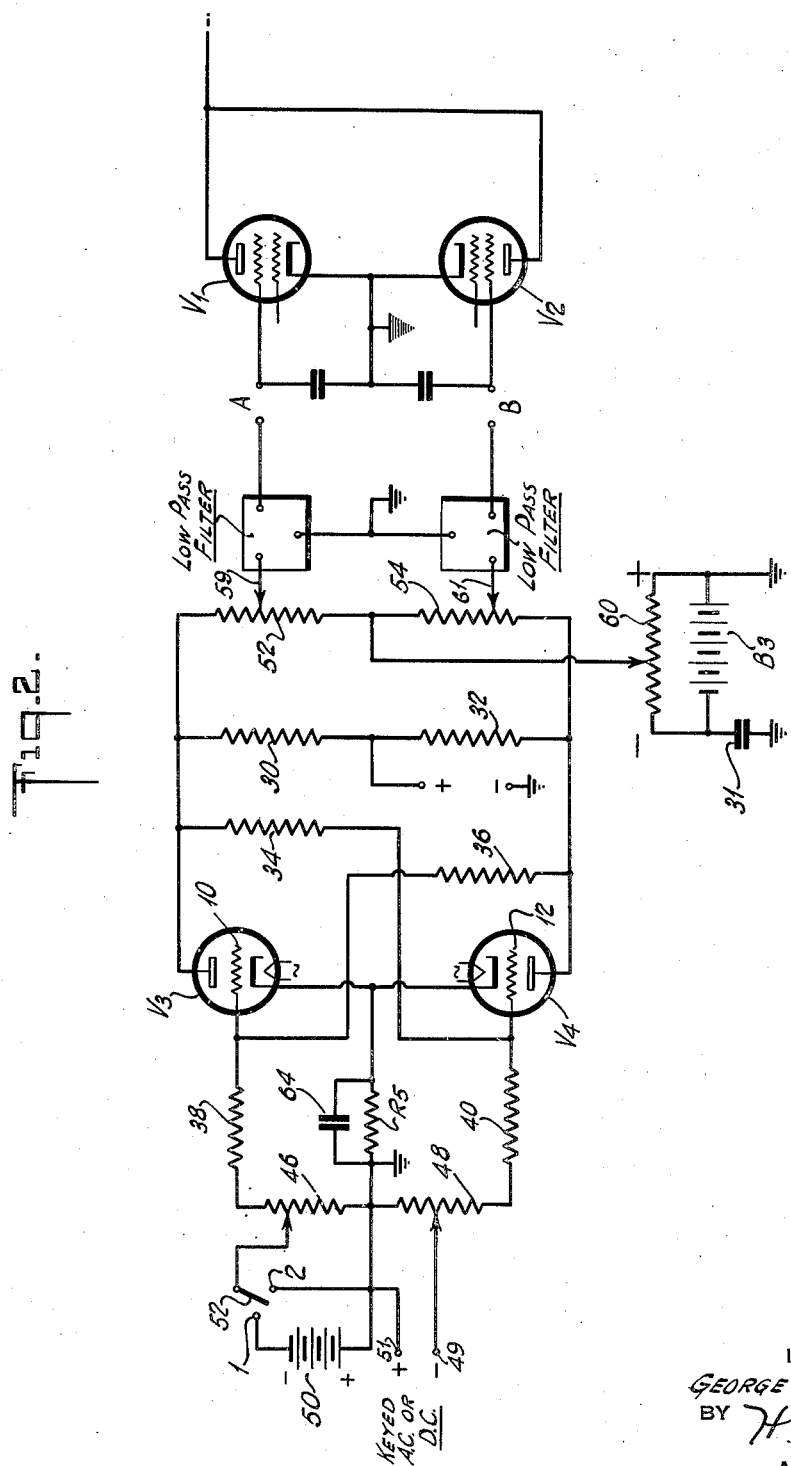

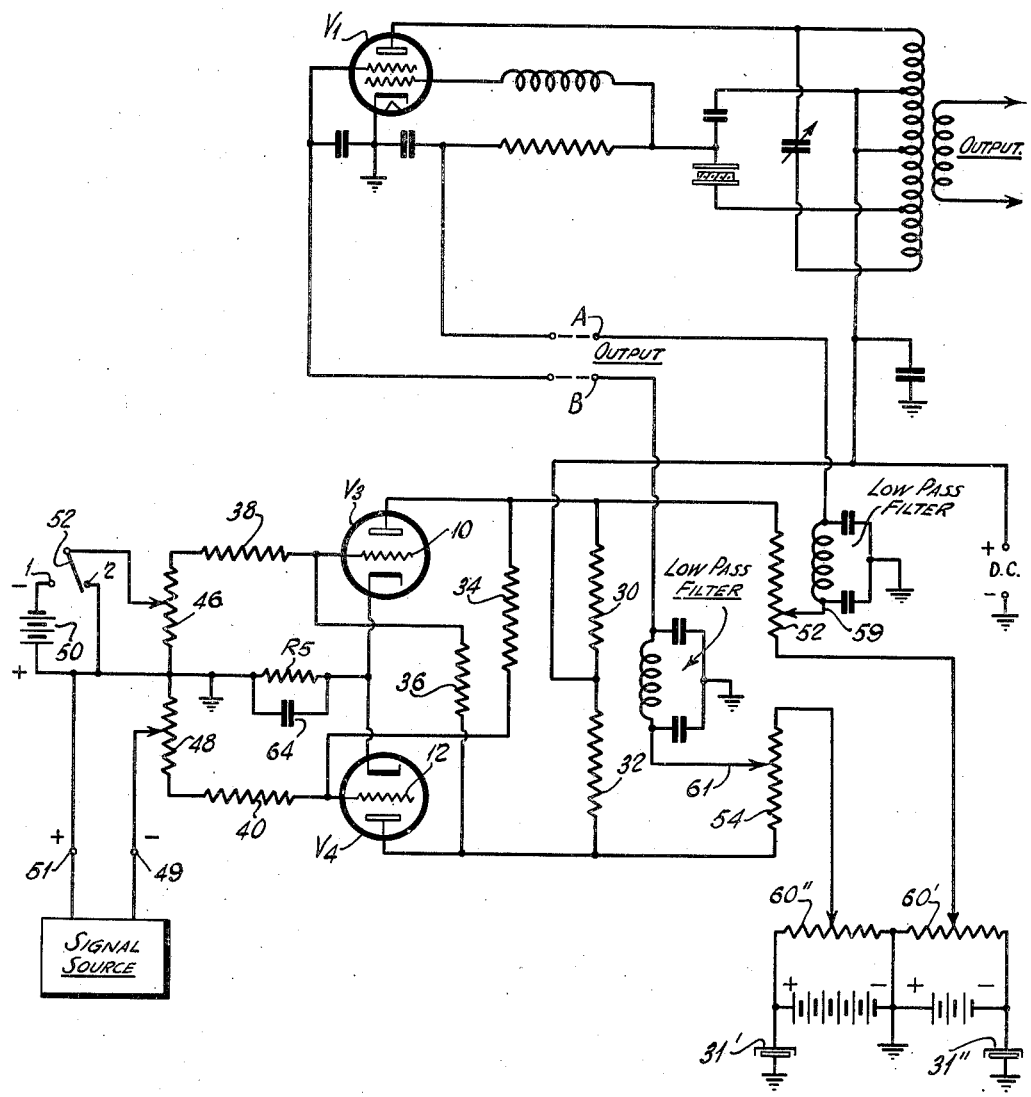

2,497,965

UNITED STATES PATENT OFFICE 2,497,965

ELECTRONIC KEYING CIRCUIT WITH ONE NEGATIVE AND ONE POSITIVE VOLTAGE OUTPUT

George L. Usselman, Port Jefferson, N. Y., assignor to Radio Corporation of America, a corporation of Delaware Application May 16, 1944, Serial No. 535,829

2 Claims. (Cl. 250—27)

This application discloses improved means for deriving from potentials or current the amplitude of which varies between two values, other potentials which vary as desired about a selected base value, which may be negative or positive as desired. The potentials may be derived from A. C. pulses or from varying direct current potentials.

This means may be considered single ended in that one output potential so varying is derived or put to use. Two potentials may be derived which vary differentially about selected base values. The base values may both be negative or both positive or one negative and the other positive. The deriving means may then in a sense be considered double ended and as having a differential output since the two potentials vary in a differential manner.

The means of this application may be put to various uses, as will be apparent to one skilled in the art. In a preferred application the derived potential or potentials are used to control or key a transmitter for the production of wave energy of carrier wave frequency, the frequency of which is shifted between two values, one of which denotes a marking condition and the other of which denotes a spacing condition. In this case the original potentials or currents represent signals to be put on the carrier wave for communication purposes. Systems for this kind of transmission are known in the art as spaced wave keying or frequency shift keying systems.

A general object of this invention is then the production of potentials which vary as desired about a base value.

Another object of this invention is the production of potentials which vary as desired about a base value which may be positive or negative and the variation may be from a positive value to a less positive value or from a negative value to a less negative value or from a positive value to a negative value and vice versa.

Another object of this invention is the production of potentials of substantially square wave form, which potentials vary about a base value of approximately zero, the potentials being alternately positive and negative in value.

An additional object of this invention is the production of two potentials as described in the preceding paragraphs which vary differentially.

A further object of this invention is to convert varying direct current potentials or pulses of A. C. into unidirectional currents of square wave form to insure certain and reliable square wave balanced keying of the frequency of wave energy when the produced unidirectional current provides potentials for keying a frequency shift transmitter.

A further object of this invention is to convert varying direct current potentials or pulses of A. C. into energies of square wave form and of limited amplitude. In other words, an object of this invention is energy converting in such a way as to provide current limiting. That is, an input signal of varying amplitude produces an output signal having an adjustable constant or uniform amplitude.

A still further object of the present invention is the production of potentials as described above under the control of signals such as used in telegraphy systems.

The manner in which the above and other objects are attained and the benefits derived from attaining the same will now be described in detail. In this description reference will be made to the attached drawings wherein Figs. 1 to 3, inclusive, each illustrate by wiring diagram the essential features of my improved means for deriving control or keying potentials. In each of these embodiments the means for deriving the potentials is shown as being controlled by keyed currents or pulses of alternating currents, both representing signals and the produced potentials are described as being used to key (frequency modulate) transmitter circuits. It will be understood that the produced pulses may be put to other uses.

As stated above in describing my improved system, it will be assumed that the same will be excited by keyed currents (D. C. or A. C.) and its output is to key or modulate the frequency of a wave generator for frequency shift telegraphy. The system is of broader application.

In Fig. 1, the keying-tripping circuit is similar to that shown in Fig. 3 of my U. S. Patent #2,326,314, dated August 10, 1943. The tubes V3 and V4 are arranged in a tripping circuit of the type shown in Finch Patent #1,844,950. As arranged, these tubes have their control grids cross-coupled to their anodes by resistances 34 and 36 in such a manner that when the grids are so excited that one of the tubes, say for example, V3, draws current, the potential drop in resistance 39 grows and resistance 34 applies a more negative potential to the grid of V4, so that this tube draws less current and the potential drop in the resistance 32 decreases and resistance 36 applies a more positive potential to the grid of tube V3 to expedite the switching of current of the system through tube V3. The potential at the anodes of tubes V3 and V4 when operated as described above, alternate differentially by tripping suddenly between positive and less positive values which may be varied to suit the needs at hand by changing the resistance values and the amount of D. C. potential applied to the adjacent ends of resistances 30 and 32. Excitation applied in such a manner as to start current through V4 reverses the operation to switch the current through V4.

In the present application, the control grid 10 and cathode of V3 are connected together by resistance 38 and potentiometer resistance 46 and bias resistor R5 shunted by a condenser 64 which is sufficiently large to form a path of low impedance to potentials of the keying frequency. The control grid 12 of tube V4 is similarly connected to the cathode of tube V4 by resistance 40, resistance 48 and resistance R5. Varying impulses (keyed D. C. or A. C.) are applied to the potentiometer 48 at contacts 49 and 51.

The arrangement is such that in the absence of signals the bias on the control grid 10 of V3 is negative and switches the current through the tube V4, as described above. Bias is obtained by the cathode resistor R5. The grids are at different potentials due to the potentiometer action of resistors 36, 38, 46 and resistors 34, 40, 48. The required negative bias may be produced by the potential drop in resistances 46 and 38 due to currents from resistor 36 and the cathode current in R5. If this bias is insufficient, it may be supplemented by negative potential from source 50 by closing switch 52 on the left hand contact. However, usually sufficient bias is obtained during operation without the use of source 50. It can be seen that grids 10 and 12 are at different positive potentials. At no signal, grid 10 is less positive because R46 is partially shorted or has a negative potential applied to it. The application of a stronger negative potential by the signal to R48 causes grid 12 to be less positive than grid 10 which trips the current in the tubes. If during keying the bias produced in resistances 38 and 46 and R5 is so highly negative that the negative marking potentials are unable to switch the current from tube V4 to V3, the switch 52 is closed in the right hand position to short out a variable portion of resistance 46. When the adjustment is as described above, and varying potentials are to be applied to control the tripping circuit, and the output is used to key a transmitter, the current is switched through tube V4 to make the potential at the anode of tube V4 less positive and the potential at the anode of tube V3 more positive, the system may be considered as in the spacing condition, which is also the condition at which no signal markings are being sent out.

Now, if a negative potential, representing marking potential, is applied to the potentiometer 48 and thence to the grid 12, this negative potential overcomes the spacing bias effect to switch current from V4 to V3. When this negative marking potential is removed or is insufficient the circuit trips current back through the tube V4 which, as stated above, is the spacing condition. The application of A. C. pulses at 49 in like manner operates the tripping circuit because the negative alternations thereof make the grid 12 more negative and current is tripped through tube V3. Moreover, A. C. keying causes the tripping circuit to function without the aid of bias 50 and 52. However, a bias is needed in case the signal is removed so as to hold the transmitter on space. While this action is taking place the potentials on the anodes of the tubes V3 and V4 are switched more positive and less positive differentially and vice versa, so that across these anodes and across resistances 30 and 32 therebetween we have positive potentials which vary differentially as the system is keyed and these positive potentials are of square wave form of constant amplitude. The tripping not only squares up the keyed wave but limits its amplitude and produces across the resistances 30 and 32 potentials of wave form ideal for keying purposes.

The outer ends of the resistances 30 and 32 are connected as shown to the anodes of tubes V3 and V4 in the tripping circuit. Adjacent ends of the resistances 30 and 32 are connected to a positive supply source and are grounded for potentials of the keying frequency by condenser 31. The differentially varying potentials described above appear at the anode ends of resistances 30 and 32 and may be used therefrom directly if desired. In the present embodiment, I desire to provide at the points A and B positive potentials which vary differentially above selected positive base values but remain positive irrespective of the said variations. To do this two potentiometer resistances 52 and 54 have their outer ends connected to the anode ends of resistances 30 and 32, and their adjacent ends grounded for potentials of the keying frequency by condenser 56 and also connected to a point on the potentiometer resistance 60 for positive supply bias at the points A and B.

It can be seen that by moving the points on 52, 54, various degrees of coupling and various amounts of signal wave may be obtained at the points A and B. At A and B it is assumed that positive potential is to be used say, for example, to apply to the screen grids 22 and 24 of a frequency modulated oscillation generator such as described in my above mentioned patent, and that direct current will also be supplied to these grids.

The positive potential is supplied from 60 to the adjacent ends of resistances 52 and 54 to lighten the direct current load on the tripping circuit and to maintain this positive bias on the screen grids 22 and 24 as the leads 59 and 61 are moved towards the adjacent ends of the potentiometers or to the lower coupling position.

Potentiometer 60 is additional means for adjusting the bias at A and B. For example, if variable signal coupling is obtained by tapping leads 59 and 61 on resistors 52 and 54, the positions of low coupling are the points of highest screen grid bias potential for tubes V1 and V2, which is not a desirable adjustment. Again for instance, if the lower adjacent ends of 52 and 54 were grounded directly for D. C. (say by moving the tap on potentiometer 60 to the right end thereof) or left ungrounded (i. e., the lead to potentiometer broken), the positions of low signalling coupling would be the points of lowest bias at points A and B, which is also undesirable. In other words, the adjustment of potentiometer 60 fixes a lower limit on the positive bias potential at A and B (for the screen grids of tubes V1 and V2) as the coupling is lowered. Adjusting the coupling between the tripping circuit and the frequency modulation oscillators V1 and V2 results in adjusting the amount of transmitter signal frequency deviation.

The condenser 64 in shunt to R5 has the effect of slightly rounding off the corner on one end of each square wave signal character. A more satisfactory way of rounding off the corners of the square wave signal characters is to connect low pass filters in series with each of the leads 59 and 61. A single section low pass filter is shown in each of the leads 59 and 61 in Fig. 1. Several sections may be cascaded if desired. These filters are preferably dimensioned to cut off at frequencies three or four times the keying frequency, or enough to round off the corners of the produced square wave keying potentials. The reason for rounding off the corners of the signal characters is to limit or reduce the frequency band width caused by harmonics.

In the arrangement of Fig. 1, it will be noted that the potentials at A and B are positive and vary differentially about positive values selected by adjustment of potentiometer resistances 52, 54 and 60. In some cases, it is desired to provide potentials at A and B which vary positive and negative about a selected value which may be positive or negative or zero potential. Then an arrangement as illustrated in Fig. 2 is used. This arrangement is substantially as illustrated in Fig. 4 of my U. S. Appln. Serial #521,907, filed February 11, 1944, now Patent Number 2,461,456, issued on February 8, 1949.

In this embodiment the potentiometer resistance 60 is in shunt to a source B3 of D. C. potential the positive terminal of which is grounded so that a variable negative potential is applied to the adjacent terminals of resistances 52 and 54. When the tripping circuit including the tubes V3 and V4 is keyed as described hereinbefore, the potentials at the anode ends of resistances 30 and 32 are alternatively more positive and less positive and vary differentially as described hereinbefore. The outer ends of the resistances 52 and 54 then are differentially excited by these alternately varying positive voltages, the alternations taking place in accordance with the keying of the input of the tubes V3 and V4.

As in Fig. 1, the source 50 is sometimes necessary to apply negative bias to the grid of tube V3 in order to get a positive or sure tripping action. The setup is such that the tube V3 is biased to cutoff in the absence of marking and spacing signals either by the drop in resistances 38 and 46, or if necessary, by the negative potential from source 50. The current is then switched through tube V4 so that the positive potential at the anode of tube V4 falls. The resistances 52 and 54 and the tap on 60 etc., are so adjusted that the desired negative potential is supplied, by source B3 and the potential at the anode of V4, to line 61 and at point B. The value of the negative potential developed at B is adjustable by adjusting the taps on 52, 54, and 60. This of course adjusts the coupling of the tubes V3 and V4 to the output at A and B. Where the potential is used to block a tube such as, for example, tube V2, the potential at B is made sufficiently negative to block this tube for reasons described in my last mentioned application.

At the same instant, the potential at A is positive because the current has been switched through tube V4. Tube V3 is cut off and little or no current flows therethrough. The potential at the anode of V3 has become more positive and is applied over resistance 30 and through resistance 52 to lead 59 where it overcomes the negative potential supplied by source 60. In the application described above the potential at A would then make tube V1 conductive.

In operation, as stated above in connection with Fig. 1, in the absence of signals at contacts 51 and 49, current is switched through the tube V4 while tube V3 is blocked. The current through the tube V4 produces an increased drop in potential through resistance 36 so that at B a negative potential is developed to block the tube V2. At the same time a positive potential is developed at the point A. Now when signals are applied to connections 51 and 49 and are sufficiently negative, the current is switched from tube V4 to tube V3 and the operation is as described above, so that tube V4 is blocked and the potential on the grid of tube V3 becomes more positive to switch the current through tube V3. This applies a negative potential at the point A and to the screen grid of tube V1 to block this tube. At the same time a positive potential is applied from the anode of tube V4 to the end of resistance 54, and through the tap thereon to the point B and the screen grid of tube V2 so that this tube becomes conductive.

The keying potentials at 51 and 49 may be alternating current or direct current pulses. Alternating potentials may be applied to the input 49. When alternating current and voltage is applied across terminals 51 and 49 it is usually done through a transformer, the primary winding of which is excited by the A. C. and the secondary winding of which is connected to points 51 and 49. During one part of the control potential cycle the grid of tube V4 is biased positive and during the other part of the cycle the grid of tube V4 is biased negative. This is evident when it is remembered that alternating currents are caused by alternate surges of positive and negative potential. The resistances 34 and 36 are of a higher value than the resistances 38 and 40 so that the positive bias from the tube anodes is overcome when negative bias is applied. During operation when switch 52 is closed the grid of tube V3 is more negative than the grid of tube V4, when no signal or when positive signal is applied to the grid of tube V4. When a sufficiently large negative signal pulse is applied to the terminal 49 the grid of tube V4 is made sufficiently more negative than the grid of tube V3 to cause the circuit to trip so that tube V4 is suddenly cut off and tube V3 carries large current. When terminal 49 goes to zero or positive potential the circuit suddenly trips back to the original condition of large current in tube V4 and no current in tube V3. Switch 52 is closed on contacts 1 or 2 when only negative pulses or potential are applied to terminal 49. If alternating positive and negative potential pulses are applied to terminal 49 when switch 52 is left open and satisfactory operation obtained.

The potentials at A and B may be used to key tubes V1 and V2 on and off by controlling the same by acting on the screen grids. If the potentiometer points on resistances 52 and 54 are correctly adjusted alternately positive and negative pulses of the proper values appear at A and B. Adjustment of 52, 54 and 60 makes the control of tubes V1 and V2 as sure as desired. The potentials are of constant maximum amplitude because of the limiting action of tubes V3 and V4, and are also of square wave form.

In other cases, it is desired to produce at points A and B potentials which vary about selected values, one negative, the other positive. An arrangement as illustrated in Fig. 3 may then be used.

In this arrangement the keying-tripping circuit including tubes V3 and V4 is connected and arranged as described hereinbefore in connection with Figs. 1 and 2, except for the following changes. The ends of potentiometers 52 and 54, instead of being connected together and to a tap on potentiometer resistance 60 as in the prior modification, are now connected to points on potentiometer resistances 60' and 60''. The potentiometer 60' shunts a source the positive end of which is grounded so that the tap on potentiometer 52 supplies a negative potential of adjustable value to the point A. The potentiometer resistance 60'' has its negative terminal grounded so that the tap on the potentiometer 54 supplies a positive potential of adjustable value to the point B. As the tubes V3 and V4 are tripped so that the current is suddenly switched from one to the other thereof and vice versa under control of the potentials from the signal source, the positive potentials at the anode ends of resistances 30 and 32 swing up and down differentially, as described hereinbefore. The variable positive potential at the anode end of resistance 30 in combination with the desired negative potential supplied to potentiometer resistance 52 produces at the point A a negative potential of adjustable value which varies up and down as the tubes V3 and V4 are controlled.

The variable positive potential at the anode end of resistance 32 with the positive potential supplied to 54 produces at the point B a varying positive potential the variations of which follow the control of the tubes V3 and V4. Both of these steady or direct current potentials are adjustable by means of potentiometers 60' and 60''. The base value of one is negative and the base value of the other is positive.

In operation, if the tube V3 carries current and the tube V4 is cutoff the negative bias at the point A goes more negative and the positive bias at the point B goes more positive. If tube V4 carries current and tube V3 is cutoff, then the negative potential at the point A becomes less negative and the positive potential at the point B becomes less positive. By appropriate adjustment of the potentiometers 52, 54, 60', and 60'', alternating positive and negative biases may be obtained at points A and B. If it is generally desirable with this arrangement to have only varying negative biases in this circuit, such may be obtained by sliding the potentiometer point 60'' toward the lower potential end or negative end of the source shunted by the potentiometer.

The varying negative and positive potentials at A and B may be put to any use. In my U. S. application Serial #535,828, filed May 16, 1944, now Patent Number 2,454,954, issued November 30, 1948, the potential at B is shown as being used to control the direct current potential on the screen grid of an oscillation generator tube V1 to shift the frequency of the oscillations generated in accordance with signals from the signal source connected to points 49 and 51. The differentially varying potential at the point A is shown as being used to supply a differential acting compensating potential to the control grid of the oscillation generator to compensate and reduce undesired amplitude modulation resulting from the frequency shift process.

In Fig. 1 of U. S. Patent #2,326,314, and in Fig. 4 of my U. S. application Serial #521,901, filed February 11, 1944, the screen grids of tubes V1 and V2 are connected to the cathodes by condensers which by-pass the radio frequency currents on the screen grids so that the said screen grids operate at substantially zero radio frequency potential and consequently act as shields or screening electrodes. The screen grid 12 of Fig. 5 of my U. S. application Serial #535,828, filed May 16, 1944, now Patent Number 2,454,954, issued November 30, 1948, operates in a similar manner. In this figure there is also a radio frequency by-pass condenser connected with the low potential end of resistance R and the cathode.

In Figs. 1 and 2 of the drawings in the present application, there is shown a radio frequency by-pass condenser between the screening electrodes and cathodes of tubes V1 and V2. When the leads 59 and 61 include low pass pi-section filters, these by-passing condensers are taken into consideration in dimensioning the last condenser in the filters.

If the radio frequency by-pass condensers connected between the screening electrodes and cathodes of tubes V1 and V2 are made small enough so that they do not materially affect the operation of the filters, then they can be left in the circuit. If the final condensers in the pi-section filters are properly dimensioned they may also serve in the filter and as radio by-pass condensers between the screening electrodes and the cathodes. Then the condensers shown adjacent to tubes V1 and V2, between the screening electrodes and cathodes, may be omitted.

The remarks made above apply in full to the end condenser of the low pass filter in lead 61 of Fig. 3, and substantially in like manner to the end condenser in the low pass filter in the lead 59 of Fig. 3. It is noted that the end condenser in the filter in lead 59 is in shunt to a by-pass condenser between a resistance and the cathode of tube V1. Here again the by-pass condenser may be omitted or taken into account in dimensioning the filter condenser.

I claim:

1. In a system of the nature described, a source of electrical energy the strength of which varies, a pair of electron discharge systems each including an electron source, an electron receiving electrode and an electron flow control electrode, an impedance connected between the electron receiving electrodes, connections for applying a potential through a tap on said impedance to the electron receiving electrodes, two other impedances each having one terminal connected to one of the electron receiving electrodes, connections to the remaining terminals of said two other impedances for applying to one thereof a negative potential and to the other thereof a positive potential, an output lead coupled to each of said other impedances to supply two potentials which are each a combination of said first named potential and one of said second named potentials, and impedances cross-connecting the electron flow control and electron receiving electrodes, the arrangement being such that when current flows through one of said discharge systems the other is cut off and vice versa to alternately and differentially vary the said first mentioned potential on the electron receiving electrodes to correspondingly vary the supplied potentials when control potentials are applied to at least one of said discharge systems.

2. In a system of the nature described, a source of electrical energy of varying potential, a pair of electron discharge systems each having an electron receiving electrode and an electron flow control electrode, an impedance connected between the electron receiving electrodes, connections for applying a positive potential through a tap on said impedance to the electron receiving electrodes, impedances cross-connecting the electron flow control and electron receiving electrodes, connections for applying a steady bias to one of said electron flow control electrodes, other connections for applying said varying potential to said other electron flow control electrode, a source of potential having its positive terminal grounded and its negative terminal connected to one of said electron receiving electrodes by a potentiometer resistance, a source of potential having its negative terminal grounded and its positive terminal connected to the other electron receiving electrode by a potentiometer resistance, and connections to said last named resistances for deriving therefrom a negative potential and a positive potential which vary differentially on the application of said varying potential to said other electron flow control electrode.

GEORGE L. USSELMAN.

REFERENCES CITED

The following references are of record in the file of this patent:

UNITED STATES PATENTS

| Number | Name | Date |
|---|---|---|
| 1,844,950 | Finch | Feb. 16, 1932 |
| 2,050,059 | Koch | Aug. 4, 1936 |
| 2,185,192 | Hansell | Jan. 2, 1940 |
| 2,262,838 | Deloraine et al. | Nov. 18, 1941 |
| 2,266,401 | Reeves | Dec. 16, 1941 |
| 2,266,668 | Tubbs | Dec. 16, 1941 |
| 2,270,449 | Kahn | Jan. 20, 1942 |
| 2,407,320 | Miller | Sept. 10, 1946 |